United States Patent [19]
Onodera et al.

[11] Patent Number: 5,309,417
[45] Date of Patent: May 3, 1994

[54] INFORMATION RECORDING/REPRODUCING APPARATUS FOR OPTICAL INFORMATION RECORDING MEDIUM

[75] Inventors: Akira Onodera, Kawagoe; Koichi Yamazaki, Sakado, both of Japan

[73] Assignee: Nippon Conlux Co., Ltd., Tokyo, Japan

[21] Appl. No.: 957,407

[22] Filed: Oct. 6, 1992

[30] Foreign Application Priority Data

Oct. 9, 1991 [JP] Japan ................................ 3-262283
Nov. 11, 1991 [JP] Japan ................................ 3-294544
Nov. 29, 1991 [JP] Japan ................................ 3-316521

[51] Int. Cl.⁵ ............................................ G11B 7/085
[52] U.S. Cl. .................................. 369/32; 369/44.28; 369/44.29; 369/54; 369/44.34
[58] Field of Search ............... 369/32, 44.25, 44.28, 369/44.29, 44.35, 54, 58, 44.34

[56] References Cited

U.S. PATENT DOCUMENTS

| | | |
|---|---|---|
| 4,698,795 | 10/1987 | Yoshio . |
| 5,054,013 | 10/1991 | Kawamura ................ 369/44.28 |
| 5,121,370 | 6/1992 | Yanagi ................ 369/44.28 X |
| 5,241,522 | 8/1993 | Yanagi ................ 369/44.28 X |
| 5,245,597 | 9/1993 | Lee et al. ................ 369/44.28 |

FOREIGN PATENT DOCUMENTS

| | | |
|---|---|---|
| 0078060 | 5/1983 | European Pat. Off. . |
| 0090379 | 5/1983 | European Pat. Off. . |
| 0391145 | 10/1990 | European Pat. Off. . |
| 0408392 | 1/1991 | European Pat. Off. . |
| 0424980 | 5/1991 | European Pat. Off. . |
| 0441969 | 8/1991 | European Pat. Off. . |
| 2081935 | 2/1982 | United Kingdom . |

OTHER PUBLICATIONS

Thomas, M., "Sample access: A substituted for continuous track counting" (FIG. 2) "Proceedings of SPIE the International Society for Optical Engineers, Optical Mass Data Storage 11", vol. 695, Aug. 18, 1986, San Diego, Calif., pp. 160–164.

Patent Abstracts of Japan, vol. 9, No. 2, (P-325), Jan. 8, 1985, & JP59-152568.
Patent Abstracts of Japan, vol. 13, No. 351, (P-912), Aug. 7, 1989, & JP1-109577.
Patent Abstracts of Japan, vol. 16, No. 100, (P-1323), Mar. 11, 1992, & JP3-276466.
Patent Abstracts of Japan, vol. 14, No. 398, P1097, Aug. 28, 1990, & JP2-149930.
Patent Abstracts of Japan, vol. 15, No. 198, P1204, May 22, 1991, & JP3-49037.
Patent Abstracts of Japan, vol. 8, No. 202, P300, Sep. 14, 1984, & JP59-84379.
Patent Abstracts of Japan, vol. 15, No. 156, P1192, Apr. 18, 1991, & JP3-25765.
Patent Abstracts of Japan, vol. 14, No. 321, P1074, Jul. 10, 1990, & JP2-103735.
Patent Abstracts of Japan, vol. 15, No. 153, P1191, Apr. 17, 1991, & JP3-23571.
Patent Abstracts of Japan, vol. 9, No. 64, P343, Mar. 23, 1985, & JP59-198570.

*Primary Examiner*—W. R. Young
*Attorney, Agent, or Firm*—Spensley Horn Jubas & Lubitz

[57] ABSTRACT

An information recording and reproducing apparatus having a motion controller for an optical head capable of moving the optical head to a target position in a short time while eliminating an error to be caused by mechanical elements and without reading a present address during the motion of the optical head from a far jump to a near jump. In the information recording and reproducing apparatus for an optical information recording medium for recording and reproducing information to and from the medium by scanning a light beam from the optical head to a track, the motion of the optical head is controlled by a combination of a far jump driving the optical head and a near jump driving an objective lens assembled with the optical head. During the far jump, the optical head is controlled to move by half the motion distance in an acceleration mode, and by the remaining half in a deceleration mode.

4 Claims, 10 Drawing Sheets

INFORMATION RECORDING/REPRODUCING APPARATUS FOR OPTICAL INFORMATION RECORDING MEDIUM

BACKGROUND OF THE INVENTION

1. Field of the Invention

The present invention relates to an information recording and reproducing apparatus for an optical information recording and reproducing apparatus for an optical information recording medium wherein information is recorded by forming a pit upon application of a light beam to the recording medium while aligning an optical head to a track position, and information is read from a pit by using the light beam.

2. Description of the Related Art

For an optical head, means is provided for generating a tracking error signal whose polarity changes between a positive polarity and negative polarity in response to a track traverse by the optical head. A track traverse detecting signal is generated by comparing the tracking error signal with a reference signal.

A conventional information recording and reproducing apparatus uses a fixed reference signal so that a tracking error signal of a low level is not detected in some case. Furthermore, when noises having substantially a large level are generated in the circuit, these noises may be detected as a track traverse, thereby forming an incorrect track traverse detecting signal. Further, if the optical system is adjusted improperly, a shoulder is generated on a tracking error signal, thereby forming an incorrect track traverse detecting signal. Still further, an incorrect track traverse detecting signal may be generated by a distortion of the tracking error signal caused by dusts or scratches on the surface of an optical image recording medium.

SUMMARY OF THE INVENTION

The present invention has been made under the above-described circumstances.

It is a first object of the present invention to provide a motion controller for an optical head capable of moving the optical head to a target position in a short time while eliminating an error to be caused by mechanical elements and without reading a present address during the motion of the optical head from a far jump to a near jump.

It is a second object of the present invention to provide a jump controller allowing an optical head to perform a near jump to a nearby track speedily It is a third object of the present invention to provide a circuit for generating a track traverse detecting signal capable of correctly detecting a track traverse even if some errors are present on a tracking error signal.

In order to achieve the above-described first object, the present invention provides an information recording and reproducing apparatus for an optical information recording medium for recording and reproducing information to and from the optical information recording medium by scanning each track of the medium with a light beam from an optical head, the optical beam being moved from a first position to a second position on the medium through a combination of a far jump driving the optical head and a near jump driving an objective lens assembled with the optical head, comprising:

position reading means for scanning the medium to read present address information;

position storage means for storing the present address information;

traverse signal generating means for generating a track traverse detecting signal by detecting that the optical beam traverses the track on the medium;

motion amount detecting means being reset at the start of the operation of the information recording and reproducing apparatus, for receiving an output of the traverse signal generating means and detecting a motion amount of the optical head over the medium;

switching means for selecting an output of the position storage means when an output of the motion detecting means is zero, and selecting an output of the motion amount detecting means when an output of the motion detecting means is not zero;

target position receiving means responsive to a next information recording and reproducing command for the medium for receiving a target position;

direction designating means for determining a motion direction by comparing the target position received by the target position receiving means with one of the present position stored in the position storage means and the motion amount detected by the motion amount detecting means;

motion distance calculating means for calculating a motion distance by comparing the target position received by the target position receiving means with the present position stored in the position storing means, and calculating the motion distance after the motion start by comparing the target position with the motion amount;

on/off controlling means for a tracking control for performing a near jump scan when the motion distance calculated by the motion distance calculating means is smaller than a predetermined value, and performing a far jump scan when the motion distance is larger than the predetermined value;

motion speed controlling means responsive to a selection of the far jump by the on/off controlling means, for controlling to move the optical head in the motion direction designated by the direction designating means, by half the motion distance calculated by the motion distance calculating means in an acceleration mode, and by the remaining half of the motion distance in a deceleration mode: and driving means for moving the optical head in accordance with outputs from the direction designating means and the motion speed controlling means The position reading means scans an optical information recording medium to obtain present address information. This address information is stored in the position storage means, and supplied via the switching means to the motion direction designating means and motion distance calculating means. The address information is compared with the target position from the target position receiving means to obtain a motion direction and motion distance.

When a light beam from an optical head traverses a track, the motion amount detecting means detects the motion amount of the optical head in accordance with a signal generated by the traverse signal generating means. This motion amount is supplied via the switching means to the motion direction designating means and motion distance calculating means.

The switching means selects an output of the position storage means when an output of the motion amount detecting means is zero, and an output of the motion amount detecting means when the output is not zero.

The selected output is supplied to the motion direction designating means and motion distance calculating means.

An output of the motion direction designating means is supplied to the driving means. An output of the motion distance calculating means is supplied to the motion speed controlling means whose output is supplied to the driving means. If the motion distance is larger than a predetermined value, a far jump is performed, and if smaller, a near jump is performed. In the case of the far jump, the on/off controlling means turns off the tracking control. The driving means drives the optical head in the direction designated by the motion direction designating means by half the motion distance calculated by the motion distance calculating means in an acceleration mode, and by the remaining half of the motion distance in a deceleration mode. In the case of the near jump, the motion speed controlling means causes the driving means to perform the position control for the tracking control. When the optical head comes near the target position by the far jump, the control automatically changes to the near jump to perform the final tracking control.

According to the present invention, the motion direction and motion distance are obtained, and if the motion distance is larger than the predetermined value, the optical head is moved by half the motion distance in an acceleration mode, and by the remaining half of the motion distance in a deceleration mode. Accordingly, the optical head can be moved in a short time without using a conventional constant speed drive.

In order to achieve the above-described second object, the present invention provides a jump controller for an optical head to jump to a nearby track for an information recording and reproducing apparatus for an optical information recording medium having a plurality of guide tracks for the information recording and reproducing, for recording and reproducing information to and from the medium by applying a light beam while making an optical head traverse a predetermined number of guide tracks and reach a target guide track, comprising:

a track traverse detecting circuit for forming a track traverse detecting signal from a tracking error signal supplied from a photodetector assembled with the optical head;

a current output circuit responsive to a track jump command for moving the optical head from a present track to another track, for supplying a drive current to an objective lens driver for an objective lens assembled with the optical head, and supplying a damping current by reversing the polarity of the drive current to the objective lens driver when the track traverse detecting signal is supplied; and a conversion circuit for converting the drive current and the damping current outputted from the current output circuit into a rapidly rising and gradually falling current.

A guide track is formed on the recording surface of an optical information recording medium Information is recorded and reproduced by making a light beam traverse guide tracks and reach a target track. In moving the light beam to the target track, the current output circuit responds to a track jump command, and supplies a drive current to the objective lens driver. The driver current is transformed by the conversion circuit into a rapidly rising and gradually falling current, and supplied to the driver. The objective lens then moves.

When the light beam reaches a track adjacent the target track, the track traverse detecting circuit supplies a track traverse detecting signal. In response to this signal, the current output circuit supplies a damping current by reversing the polarity of the drive current to the driver. The damping current is transformed by the conversion circuit into a rapidly rising and gradually falling current, and supplied to the driver.

According to the present invention, a rapidly rising and gradually falling drive current is supplied to the objective lens driver to move the light beam, and when the light beam reaches an adjacent track, the polarity of the drive current is reversed, and a rapidly rising and gradually falling damping current is supplied. Accordingly, the objective lens driver can be accelerated rapidly and decelerated gradually. As compared with a conventional gradual acceleration and deceleration, jumping tracks can be completed in a very short time duration.

In order to achieve the above-described third object, the present invention provides a track traverse detecting signal generating circuit for an optical information recording medium, comprising:

signal generating means for generating a tracking error signal changing the polarity between a positive polarity and a negative polarity in response to a traverse of each track of the optical information recording medium by an optical head;

a comparator having an inverting input terminal, non-inverting input terminal, and output terminal, with a feedback element being connected between the non-inverting input terminal and the output terminal, for receiving the tracking error signal at the inverting input terminal, judging the level of the tracking error signal by using the potential at the non-inverting input terminal, and outputting the judgment result from the output terminal;

a potential control circuit for changing the feedback element between the non-inverting input terminal and the output terminal to have a large feedback amount when a tracking control signal is supplied so as to make the optical head follow the track, and fixing the potential at the non-inverting input terminal, and changing the feedback element to have a small feedback amount when the tracking control signal is not supplied, and changing the potential at the non-inverting input terminal in accordance with a direction control signal for controlling the motion direction of the optical head; and an output circuit for outputting a track traverse detecting signal in accordance with the judgment result by the comparator and the direction control signal, whereby the track traverse detecting signal is generated in accordance with the tracking error signal.

The signal generating means generates a tracking error signal reversing its polarity in response to a traverse of a track of an optical information recording medium by an optical head. This tracking error signal is supplied to the inverting input terminal of a comparator to compare it with a potential at the non-inverting input terminal. The comparator outputs a comparison result signal to an output terminal. This output signal is fed back to the non-inverting input terminal via a feedback element so that the potential at the non-inverting input terminal changes with the output signal of the comparator. With the operation of the potential control circuit, a large feedback amount of the feedback element is used when a tracking control signal is supplied, so that the potential at the non-inverting input terminal is easy to change with the output signal level. When the tracking control signal is not supplied, a small feedback amount is used to change the potential at the non-inverting input terminal with the output signal level.

Specifically, the level of the signal supplied to the non-inverting input terminal of the comparator changes, which means that a reference level for judging the level of the tracking error signal changes. Therefore, even the tracking error signal contains a level change which may cause an error, this level change is not detected because of the change in the reference level.

The detected signal by the comparator is supplied to the output circuit to reference the direction control signal and generate a track traverse detecting signal.

According to the present invention, a feedback element is connected between the non-inverting input terminal and output terminal of the comparator for checking the level of the tracking error, and the reference potential at the non-inverting input terminal is changed with the level of the tracking error signal. Accordingly, a track traverse can be detected without adverse affect of noises contained in the tracking error signal.

DETAILED DESCRIPTION OF THE PREFERRED EMBODIMENT

Figure 1:
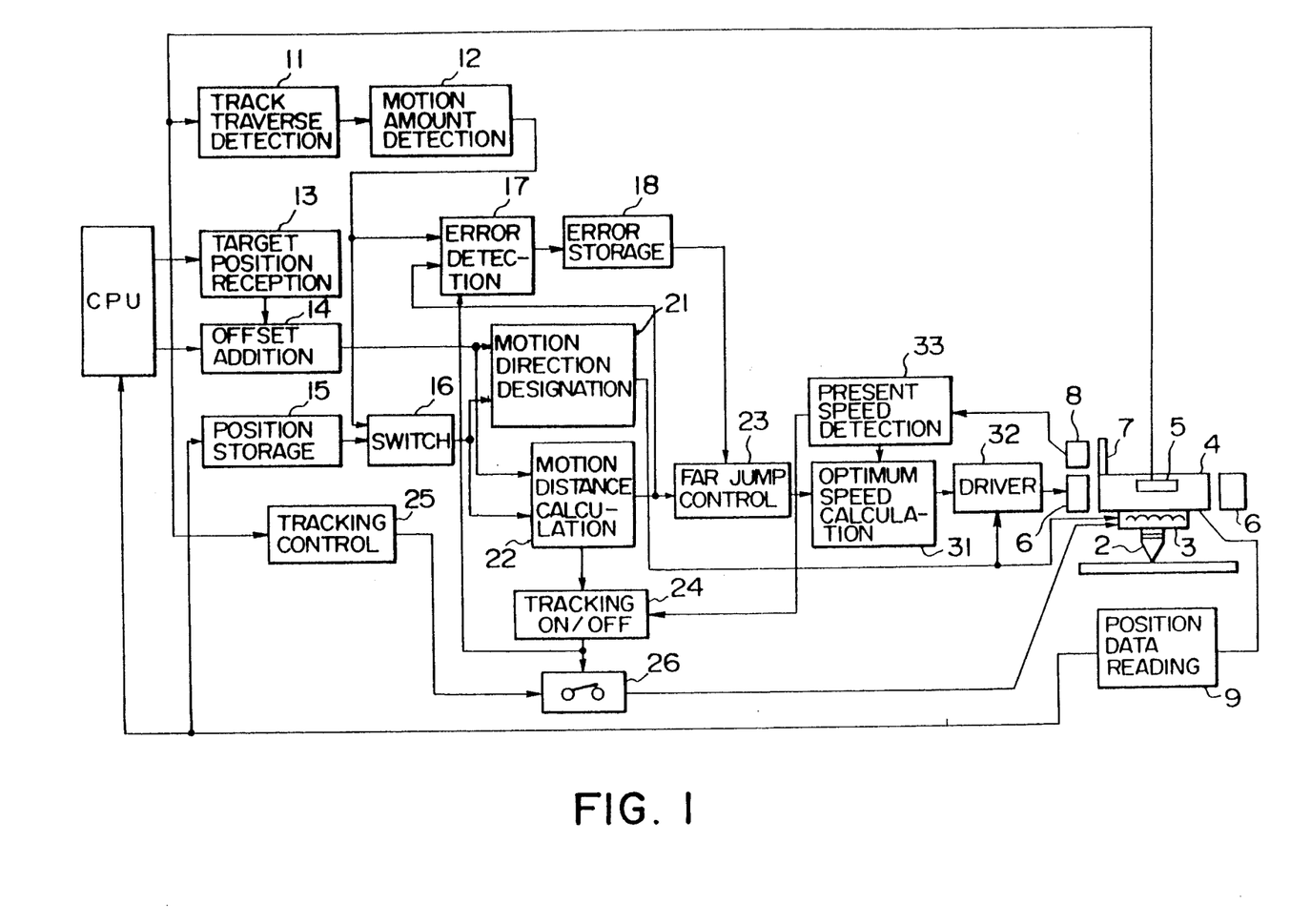
FIG. 1 is a block diagram showing the circuit arrangement of an embodiment of the present invention.

FIG. 1 is a block diagram showing the structure of an information recording/reproducing apparatus according to an embodiment of the present invention. In this embodiment, information is recorded and reproduced using a so-called optical card as an optical information recording medium. At the right side of FIG. 1, the mechanical part of the apparatus is shown. A light beam is focussed on the recording surface of an optical card 1.

The position of the light beam on the optical card 1 is detected by a tracking error detector 5 which detects a reflected light as a tracking error signal. This tracking error signal is supplied to a tracking controller 25. A closed circuit is formed by the tracking error detector 5, tracking controller 25, closed switch 26, and an actuator 3. The actuator 3 performs a so-called tracking control which controls an objective lens (not shown) so as to make the tracking error have a zero value, i.e., make the light beam always locate the center of a track. The actuator 3 also performs a near jump, i.e., jumping to a nearby track. The tracking error signal is detected by the tracking error detector 5.

In the case of a far jump, the switch 26 is opened to open the tracking control loop and stop the operation of the actuator 3. A linear motor 6 then moves the optical head whose motion speed is detected by sensing a scale 7 with a sensor 8.

This apparatus constructed as above is controlled by a CPU. CPU supplies the apparatus with a motion command to control the apparatus. A position data reading unit 9 reads address data of the optical card as the position data.

The circuit portion to be controlled by CPU will be described.

A motion command from CPU is supplied to a target position receiving unit 13 to write the target position data in this unit 13. The position data written in this unit 13 is supplied to an offset adder 14. CPU supplies an offset addition command to this adder 14 so as to avoid a track overrun near at the periphery of the card. The resultant position data is then supplied to a motion direction designating unit 21 and to a motion distance calculating unit 22.

A present position data is also supplied to the motion direction designating unit 21 and to the motion distance calculating unit 22. The present position data before the start of moving the optical head 4 is read from the optical card 1 by the position data reading unit 9 and supplied to a position data storage unit 15. This stored data is used as the present position data before the start of moving the optical head 4.

The present position data after the optical head 4 moved is detected by a track traverse detecting unit 11 and motion amount detector 12, and supplied via a switch 16 to the motion direction designating unit 21 and motion distance calculating unit 22. The switch 16 selects data from the motion amount detector 12 and position storage unit 15.

An output of the motion direction designating unit 21 is supplied to a driver 32 to drive the optical head 4, and to the actuator 3 to drive the objective lens.

An output of the motion distance calculating means 22 is supplied to a tracking on/off circuit 24 because this output determines whether the tracking control is required or not. The tracking on/off circuit 24 turns on or off the switch 26. An output of the motion distance calculating means 22 is also supplied to a far jump controller 23.

The far jump controller 23 then generates an acceleration/deceleration pattern in accordance with the tracking motion distance, and supplies it to an optimum speed calculating unit 31. In this case, an error of the far jump carried out at the preceding time and stored in an error storage unit 18 is considered to generate the acceleration/deceleration pattern.

The optimum speed calculating unit 31 is supplied with the present speed from the present speed detector 33, and sends an acceleration/deceleration signal to the driver 32 to drive a linear motor 6. An output of the present speed detector 33 is also supplied to the tracking on/off circuit 24 so that when the linear motor 6 is decelerated sufficiently, the tracking control starts.

An output of the tracking on/off circuit 24 is supplied to the error detector 17 so as to use it in generating a far jump completion signal. Specifically, the error detector 17 calculates a difference between the target position at the time of the far jump completion and the present position, the difference being supplied to the error storage unit 18 and to the far jump controller 23.

Figure 2:
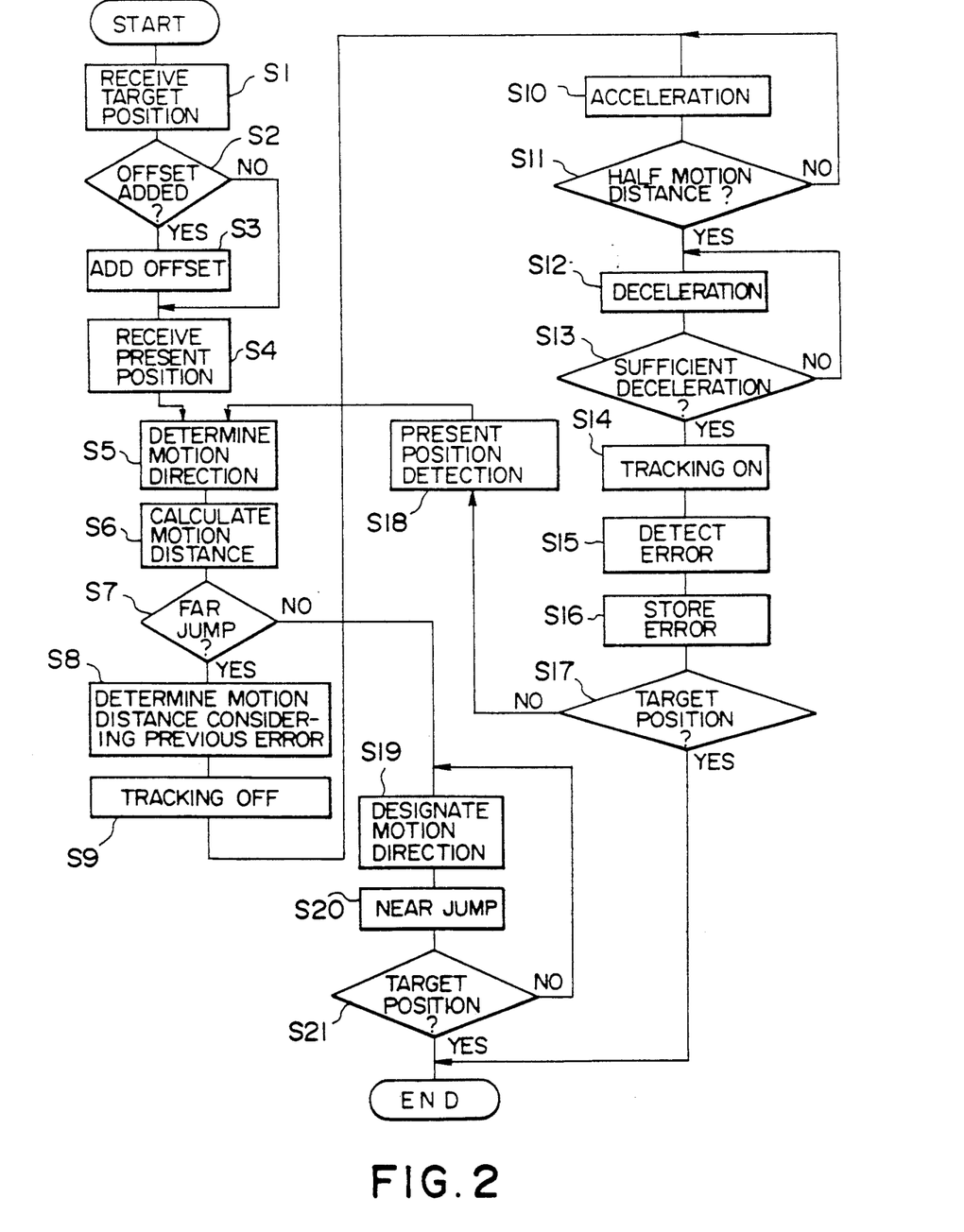
FIG. 2 is a flow chart illustrating the operation of the embodiment shown in FIG. 1.

FIG. 2 is a flow chart illustrating the operation of the apparatus shown in FIG. 1. The operation of the apparatus will be described with reference to this flow chart.

CPU issues a motion command to write the position data of a target track in the target position receiving unit 13 (step S1). At step S2, CPU checks whether the target track is near at the card periphery and whether an offset addition is required. If necessary, at step S3 the offset adder 14 adds an offset to the target position to avoid a track overrun.

Thereafter, at step S4 the data previously written in the position storage unit 15 by the position data reading unit 9 is supplied via the switch 16 to the motion direction designating unit 21 and motion distance calculating unit 22. At step S5 the motion direction is determined, and at step S6 a motion distance is calculated.

The far jump controller 23 judges from the magnitude of the obtained motion distance whether a far jump is required (step S7). If a far jump is required, at step S8 the far jump controller 23 determines an acceleration/deceleration pattern while considering the previous error stored in the error storage unit 18. An output of the tracking on/off unit 24 opens the switch 26 to turn off the tracking control (step S9).

In this state, at step S10 the optimum speed calculating unit 31 activate the driver 32 to drive the linear motor 6, in accordance with the determined acceleration/deceleration pattern. Acceleration continues before half the motion distance (step S11). At half the motion distance, the optimum speed calculating unit 31 starts a deceleration at step S12. It is checked at step S13 whether the deceleration has been made sufficiently. If sufficient, at step S14 the tracking control starts.

A position error at the time when the far jump operation transits to the tracking control, is detected by the error detector 17 at step S15, and stored at step S16 in the error storage unit 18.

If the target position has been obtained at step S17, the tracking controller 25 performs the tracking control. If not, instead of an output from the position storage unit 15, the switch 16 selects an output from the motion amount detector 12 and sends it to the motion direction designating unit 21 and motion distance calculating means 22. In this manner, the motion direction designating unit 21 and motion distance calculating means 22 can know the present position which is a difference between the motion amount generated by the motion of the optical head and objective lens and the initial position data given from the position data reading unit 9.

The operations of steps S5 to S17 are repeated until the target position is obtained. During these operations, if the far jump controller 23 judges that the operation to be carried out is not the far jump, in the motion direction designated by the motion direction designating unit 21 at step S19, the driver 32 operates to perform a near jump at step S20. At step S21 it is judged at step S21 if the target position has been obtained. If not, the operation returns to step S19. If obtained, the operation terminates.

Figure 3:
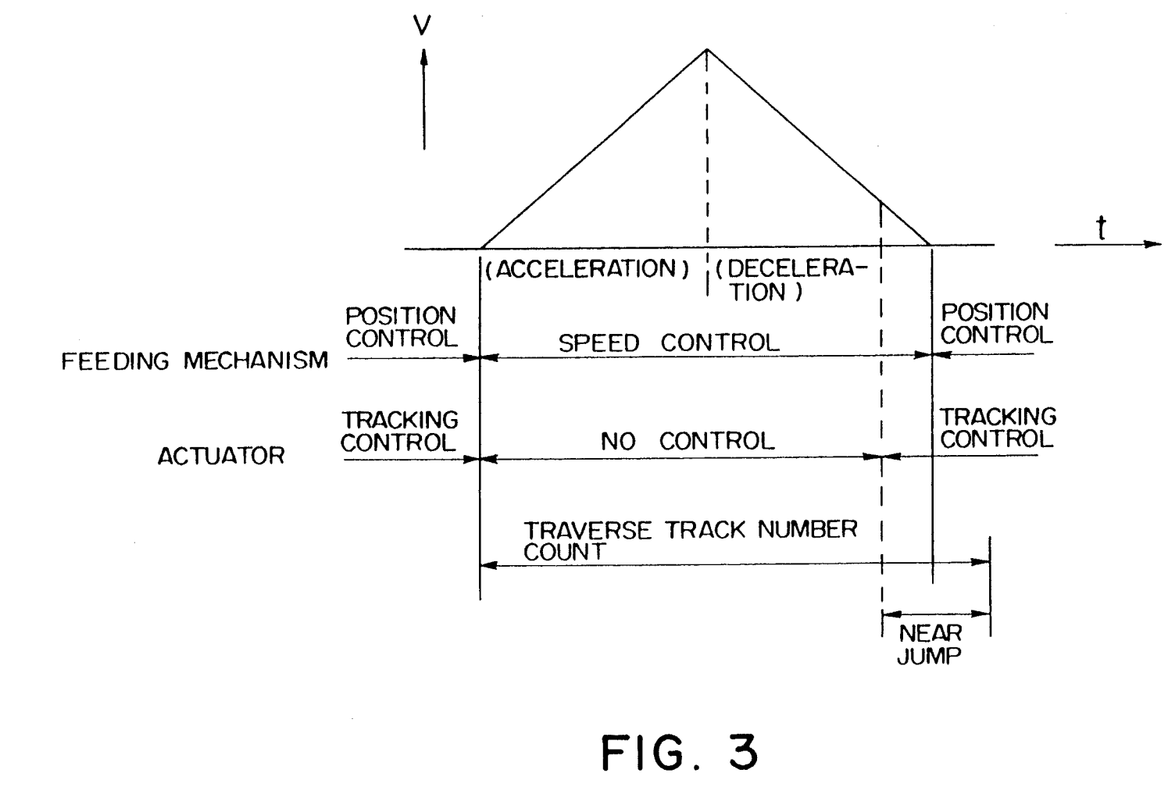
FIG. 3 shows an example of an acceleration/deceleration pattern according to the embodiment shown in FIG. 1.

FIG. 3 shows an example of an acceleration/deceleration pattern to be used during the speed control operation. This pattern has no constant speed area, and the acceleration area is immediately followed by the deceleration area. The time required for the conventional constant speed is not necessary, allowing to reach the target position faster.

The feeding mechanism (linear motor for the optical head) is subject to an acceleration/deceleration control by the circuit shown in FIG. 1 during the speed control operation. During the other operation, the position of the feeding mechanism is controlled by a position controller (not shown). During the speed control operation of the feeding mechanism, the actuator is not controlled or it is under the tracking control. During the position control operation of the feeding mechanism, the actuator is under the position control.

Figure 4:
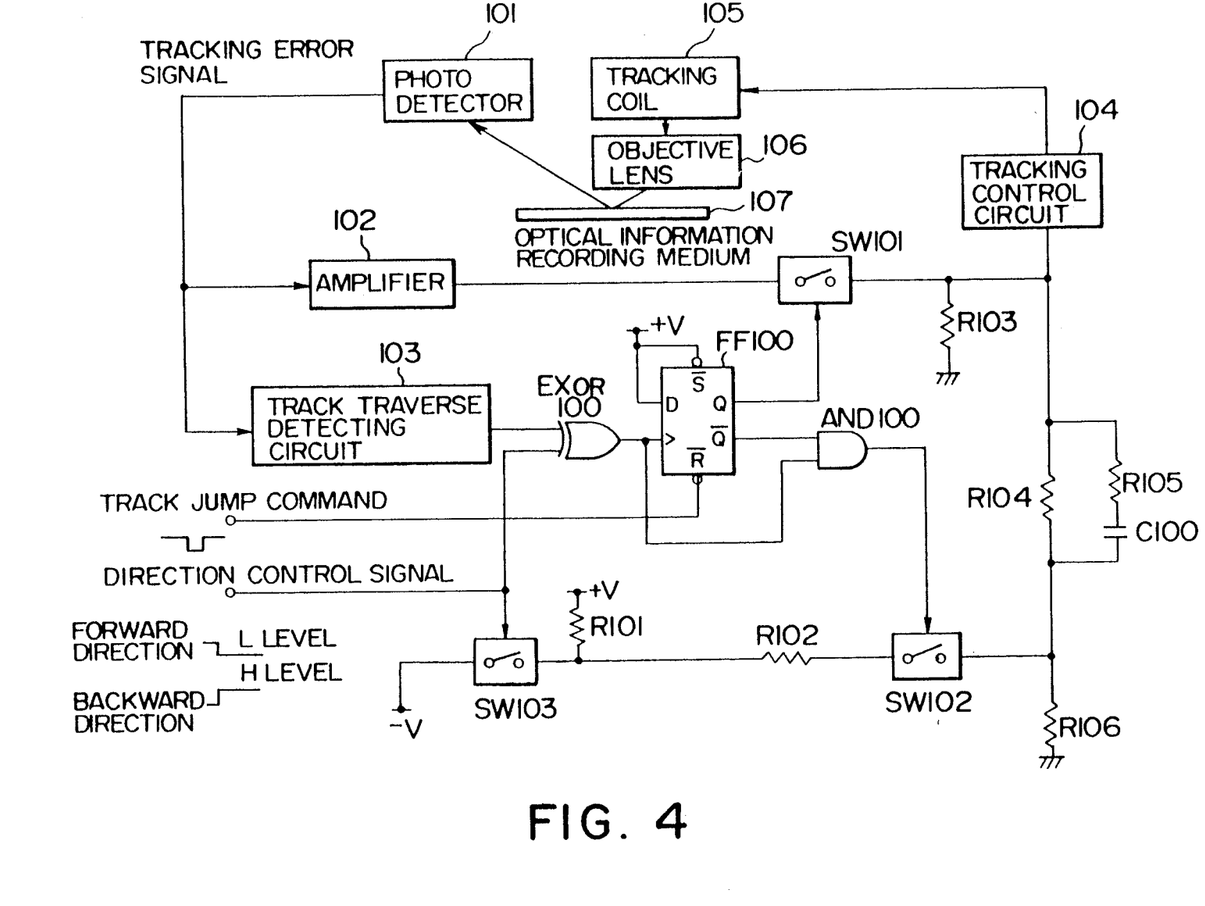
FIG. 4 is a circuit diagram according to another embodiment of the present invention.
Figure 5:
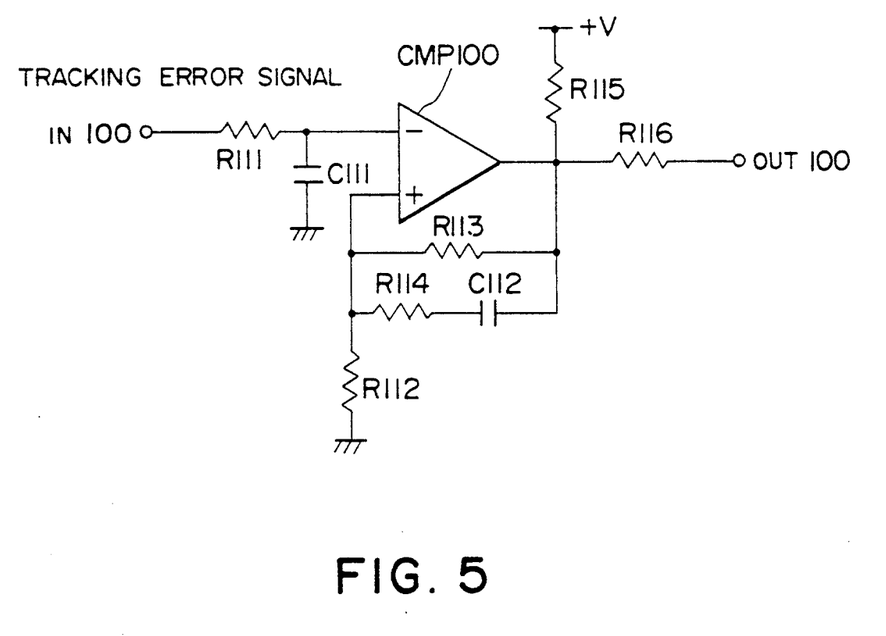
FIG. 5 is a detailed circuit diagram of the track traverse detector shown in FIG. 4.
Figure 6:
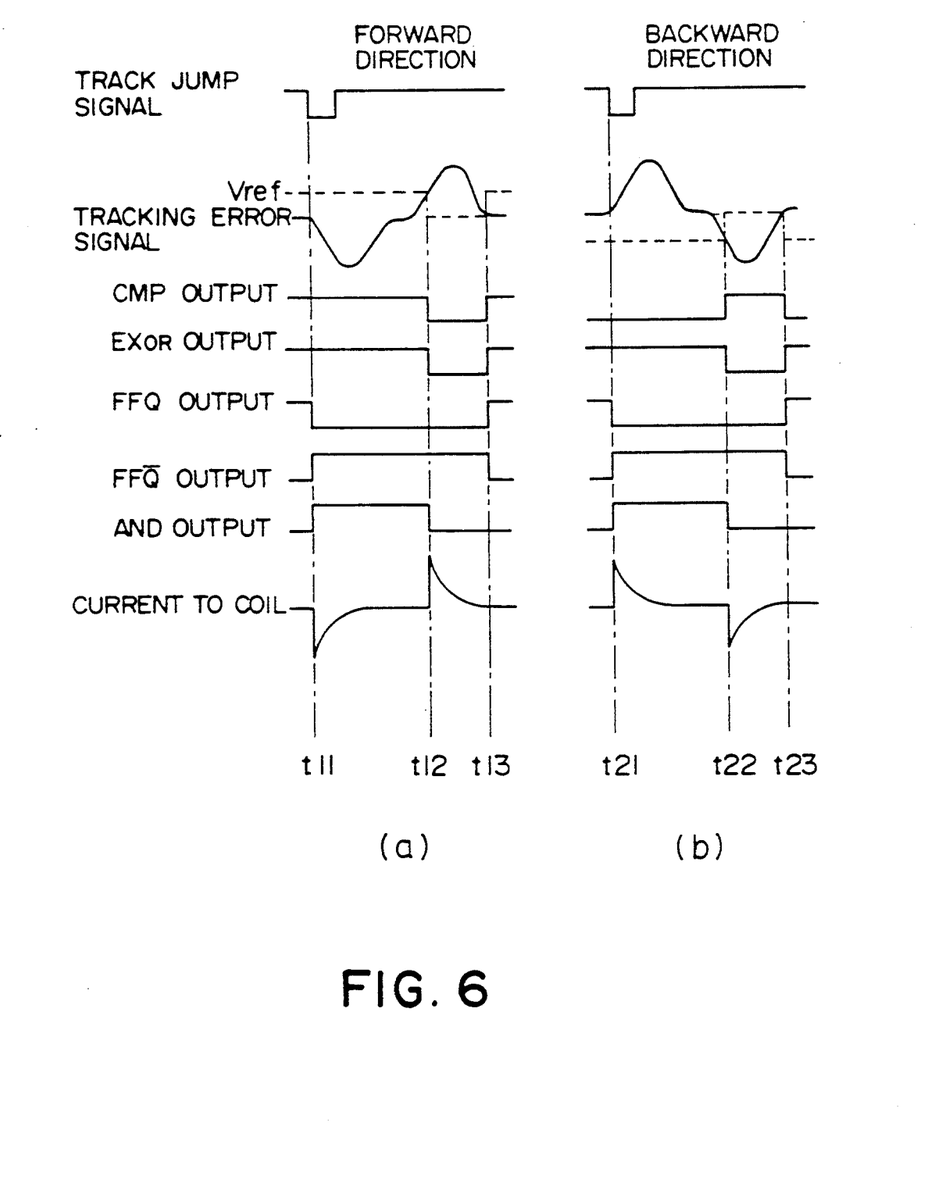
FIG. 6 includes timing charts showing the signal waveforms at various circuit portions shown in FIG. 4.

FIG. 4 is a circuit diagram showing the structure of an embodiment of a near jump controller for controlling an optical head to jump to a nearby track according to the present invention. FIG. 5 is a detailed circuit diagram showing the structure of the track traverse detector in the circuit shown in FIG. 4. FIGS. 6A and 6B are timing charts showing signal waveforms at various circuit portions shown in FIG. 4.

Referring to FIG. 4, reference numeral 107 represents an optical information recording medium. A light beam radiated through an objective lens 106 is focussed on the optical card 107, and the reflected light is applied to an optical detector 101 to form a tracking error signal. This tracking error signal is amplified by an amplifier 102 and supplied via a switch SW101 to a tracking controller 104 to drive a tracking coil 105 for driving the objective lens 106.

The tracking error signal is also supplied to a track traverse detector 103 the details of which will be later described with FIG. 5. The track traverse detector 103 shapes the tracking error signal into a rectangular waveform to generate a track traverse detecting signal.

This track traverse detecting signal is supplied to one input terminal of an exclusive OR EXOR100. Supplied to the other input terminal of EXOR100 is a direction control signal which takes an L level when the objective lens is moved in the forward direction and an H level when it is moved in the backward direction. The direction control signal is also used for opening and closing a switch SW103. For the forward direction, the switch SW103 opens to supply the positive power source voltage $+V$ to the left contact of the switch SW102 as viewed in FIG. 4 via resistors R101 and R102. For the backward direction, the switch SW103 closes to supply the negative power source voltage $-V$ to the left contact of the switch SW102 via the resistor R102.

A signal at the Q output terminal of a flip-flop FF is used for opening and closing the switch SW101. This signal of an H level closes the switch SW101 to always maintain the light beam at the center of a track, and the signal of an L level opens the switch SW101. A signal at an inverted Q output terminal of the flip-flop FF100 as well as an output from EXOR100 is supplied to an AND gate AND100 whose output is used for opening and closing the switch SW102.

While the switch SW101 opens and the switch SW102 closes, a voltage corresponding to the state of the switch SW103 is supplied to the tracking controller 104 via a conversion circuit made of a parallel circuit of a resistor R104 and a serially connected resistor R105 and capacitor C100. The tracking controller 104 flows a current to the tracking coil 105 to start moving the objective lens 106. When the switch SW102 opens under this condition, the tracking controller 104 receives a voltage signal of an inverted polarity and flows a damping current to the tracking coil 105.

FIG. 5 shows the detailed structure of the track traverse detector 103 shown in FIG. 4. The tracking error signal applied to an input terminal IN is supplied to the inverting terminal of a comparator CMP100 via an integrator made of a resistor R111 and capacitor C111. A reference signal Vref is applied to the non-inverting input terminal of the comparator CMP100. The tracking error signal is compared with the reference signal, and the comparison result is outputted via a resistor R116 to an output terminal OUT100. This reference voltage Vref is a voltage divided by a serial circuit made of resistors R115, R113, and R112.

The resistor R113 is a feedback element connected between the non-inverting input terminal and output terminal of the comparator CMP100. The reference voltage Vref changes with an output voltage of the comparator CMP100. As the feedback element of the comparator CMP100, a serial circuit of a resistor R114 and capacitor C112 is also connected to add an offset to an output of the comparator CMP100.

FIG. 6(a) and (b) shows signal waveforms at various circuit portions of FIG. 4 during the forward jump and backward jump operations. The operation of the circuit of FIG. 4 will be described with reference to these waveforms shown in FIG. 6(a) and (b).

Forward Direction Jump

In order to determine the motion direction, the direction control signal is set to an L level for the forward direction jump. With the L level signal, the switch SW103 opens, and so the positive voltage is applied via the resistors R101 and R102 to the left contact of the switch SW102. A track jump command of an L level is issued at time $t_1$ and supplied to an inverted reset terminal R of the flip-flop FF100. Therefore, the Q output of the flip-flop FF100 takes an L level to open the switch SW101 and stop the control of making the light beam follow the center of a track. The inverted Q output of the flip-flop FF100 takes an H level to close the switch SW102 and supply a positive voltage to the converter circuit made of the resistors R104, R105 and capacitor C100. Accordingly, a drive current shown in FIG. 6(a) flows in the tracking coil 105 to start moving the objective lens 106 in the forward direction.

As the objective lens 106 moves, the tracking error signal changes from a zero level to a negative level and from the zero level to a positive level. When the tracking error signal becomes larger than the reference value Vref, the track traverse detecting signal takes an L level. Therefore, both the inputs to EXOR100 are L level, and the output is L level. With an L level of the output of EXOR100, the input conditions of the AND gate AND100 are negated. Therefore, the AND gate AND100 supplies an L level signal to the switch SW102 to open it.

Accordingly, the positive voltage having been applied to the conversion circuit disappears at once so that a current in the opposite direction will flow through the tracking coil 105 to provide a fast damping. This damping is carried out at time $t_{12}$ shown in FIG. 6(a). At time $t_{13}$ when the tracking error signal again takes the zero level (when the light beam reaches the center of the track), the track traverse detecting signal takes an H level. With H and L level inputs, EXOR100 outputs an H level signal. The rising edge of this H level signal is applied to a clock terminal of the flip-flop FF100 so that the Q output of the flip-flop FF100 takes an H level to close the switch SW101 and lock the objective lens 106 at that position. The inverted Q output of the flip-flop FF100 takes an L level, and so the input conditions of the AND gate AND100 are negated to supply an L level signal to the switch SW102.

Backward Direction Jump

In order to determine the motion direction, the direction control signal is set to an H level for the backward direction jump. Therefore, the switch SW103 closes, and so the negative voltage is applied via the resistor R102 to the left contact of the switch SW102. When the switch SW102 closes, the direction of the current flowing through the tracking coil 105 becomes opposite to that during the forward direction jump. As shown in FIG. 6(b), the tracking error signal changes in the opposite direction to that shown in FIG. 6(a). The operation is similar to that during the forward direction jump except that the input conditions to EXOR100 are reversed.

Figure 7:
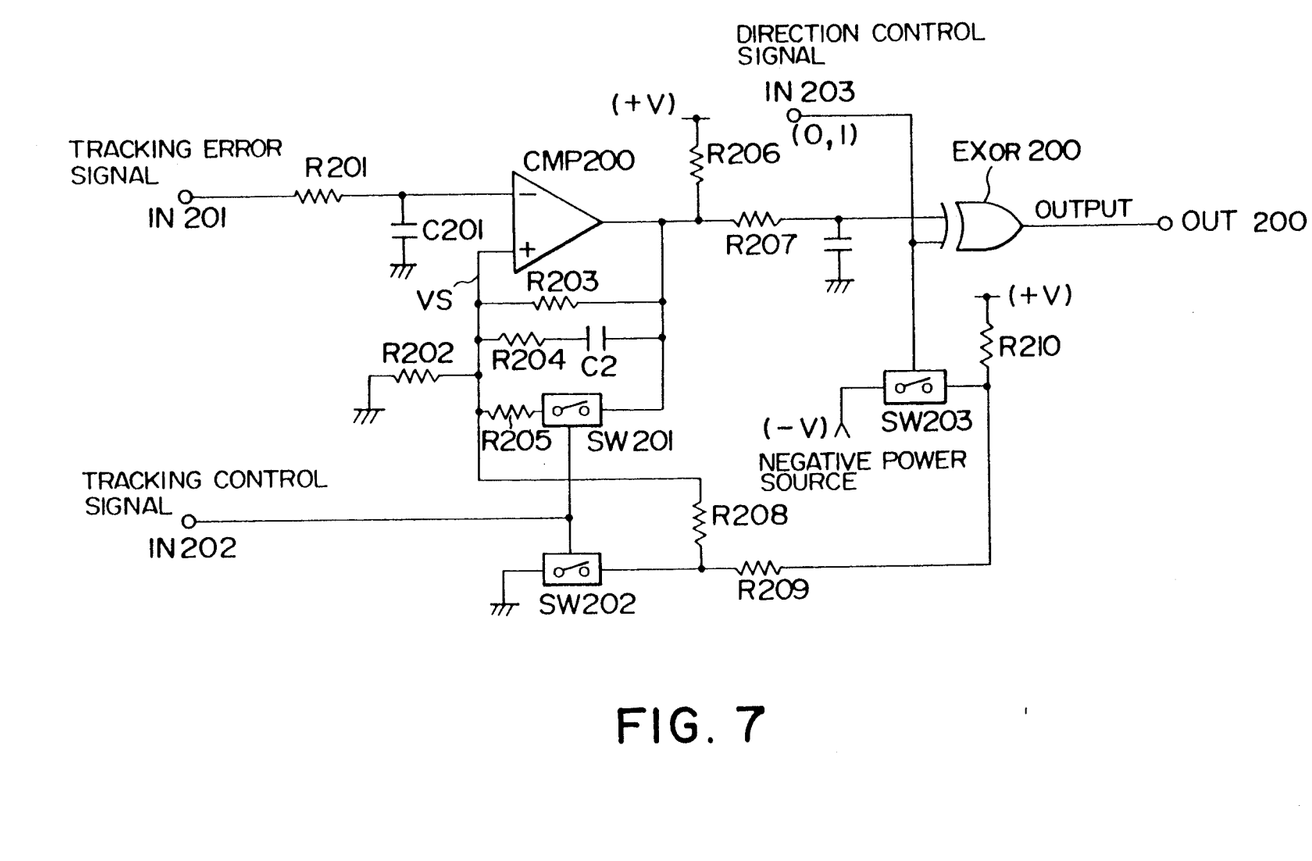
FIG. 7 is a circuit diagram showing another embodiment of the present invention.

FIG. 7 is a circuit diagram showing another embodiment of the present invention. In FIG. 7, IN201 to IN203 represent input terminals. The input terminal IN201 is supplied with a tracking error signal which is detected with a detector assembled with an optical head (not shown). The input terminal IN201 is supplied with a tracking control signal, and the input terminal IN203 is supplied with a direction control signal.

The tracking error signal applied to the input terminal IN201 is an analog signal whose polarity becomes positive and negative in response to a track traverse of the optical head. The tracking error signal is supplied to the non-inverting input terminal of a comparator CMP200 via an integrator made of a resistor R201 and capacitor C201. Connected between the non-inverting input terminal and output terminal of the comparator CMP200 are a first feedback element constructed of a resistor R203, a second feedback element constructed of a serially connected resistor R204 and capacitor C202, and a third feedback element constructed of a serially connected resistor R205 and switch SW201. The first and second feedback elements are always connected, and the third feedback element is connected or disconnected by the switch SW201 to change the feedback amount which becomes large when the switch SW201 is closed, and small when it is opened.

The tracking control signal applied to the input terminal IN202 is an on/off signal which is directly supplied to the switches SW201 and SW202. These switches close during the on-tracking, and open during the off-tracking. When the switch SW201 close, the resistor R205 is connected between the non-inverting input terminal and output terminal of the comparator CMP200 to increase the feedback amount between these terminals. When the switch SW202 closes, the interconnection point between the resistors R208 and R209 is grounded via the switch SW203, so that the direction control signal applied from the input terminal IN203 via the resistor R209 does not reach the non-inverting input terminal of the comparator CMP200.

The direction control signal applied to the input terminal IN203 is an on/off signal which is directly supplied to the switch SW203. The switch SW203 opens for the forward direction, and closes for the backward direction. The direction control signal is applied to one input terminal of an exclusive OR EXOR200, and the other input terminal is supplied with an output signal from the comparator CMP200. The result of the logical operation by EXOR200 is used in generating the track traverse detecting signal.

The tracking error signal from the input terminal IN201 is applied to the non-inverting input terminal of the comparator CMP200. The non-inverting input terminal is grounded via a resistor R202, and connected via the resistors R208 and R209 to the interconnection point between a resistor 210 and switch SW203. The switch SW203 opens and closes in response to the on and off of the direction control signal. During the forward direction control, the switch SW203 opens to supply a positive voltage +V from a positive power source to the non-inverting input terminal of the comparator CMP200 via the resistors R208 and R209. During the backward direction control, the switch SW203 closes to supply a negative voltage −V from a negative power source to the non-inverting input terminal of the comparator CMP200 via the resistors R208 and R209.

An output terminal of the comparator CMP200 is connected to the positive power source +V via a resistor R206, and to the other input terminal of EXOR200 via an integrator made of a resistor R207 and capacitor C203.

Figure 8:
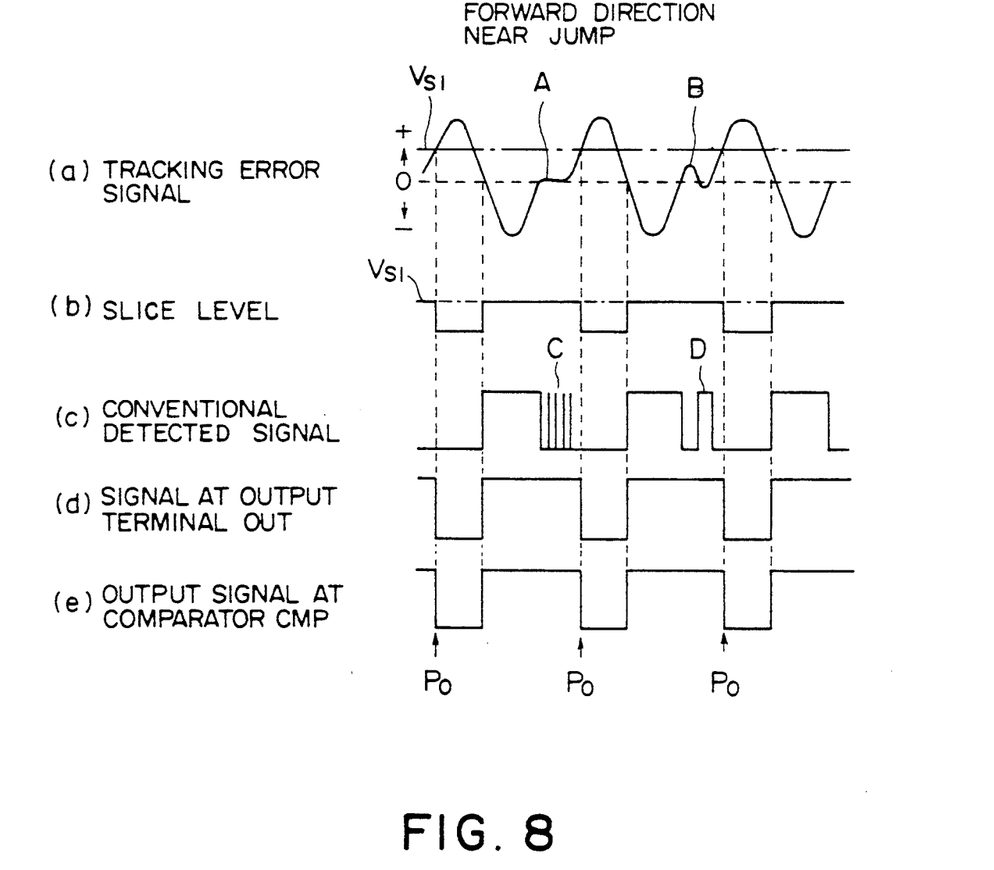
FIG. 8 shows signal waveforms at various circuit portions shown in FIG. 7 during the forward direction near jump.
Figure 9:
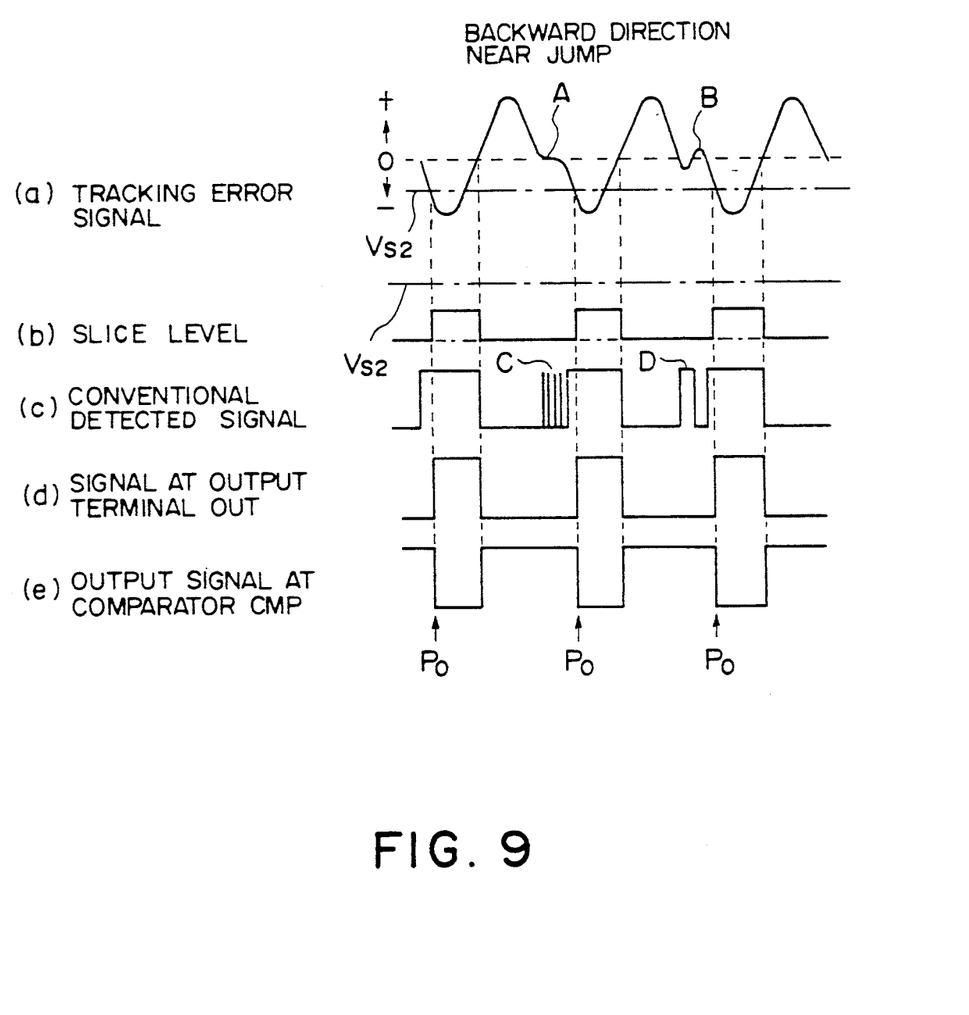
FIG. 9 shows signal waveforms at various circuit portions shown in FIG. 7 during the backward direction near jump.
Figure 10:
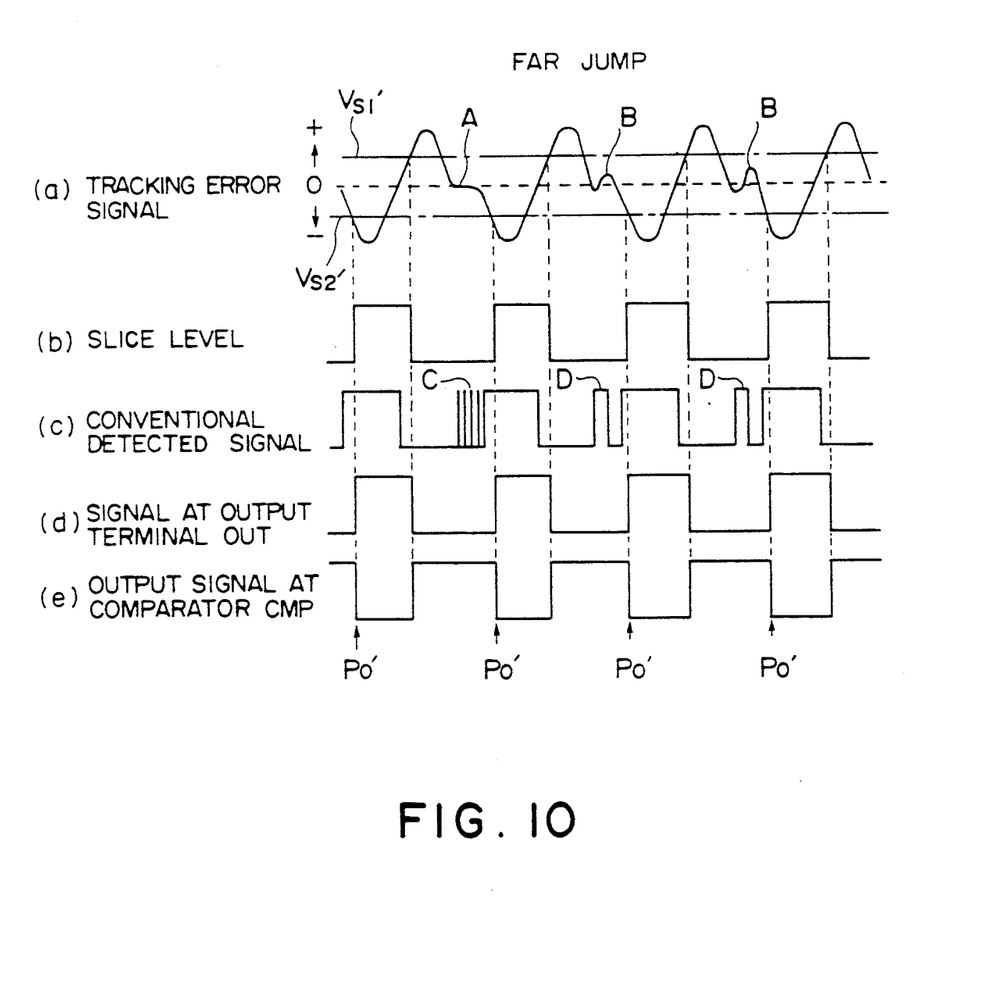
FIG. 10 shows signal waveforms at various circuit portions shown in FIG. 7 during the far jump.

FIGS. 8 to 10 show waveforms at various circuit portions of the circuit shown in FIG. 7 during various operations. FIG. 8 is for the forward direction near jump, FIG. 9 is for the backward direction near jump, and FIG. 10 is for the far jump, a comparison with a conventional circuit operation being provided. In FIGS. 8 to 10, waveforms indicated at (a) are of the tracking error signal, waveforms indicated at (b) are of a slice signal for slicing the tracking error signal, waveforms indicated at (d) are of the signal at an output terminal OUT, and waveforms indicated at (e) are of the output signal of the comparator CMP200.

Three operation modes including a forward direction near jump mode, backward direction near jump mode, and far jump mode, are selected by the on/off operations of the switches SW201 to SW203. In the forward near jump mode, all the switches SW201, SW202, and SW203 are turned off. In the backward near jump mode, the switches SW201 and SW202 are turned off and the switch SW203 is turned on. In these two jump modes, the tracking control is performed to correctly align the optical head on a track. In the far jump mode, the switches SW201 and SW202 are turned on (the switch SW203 may be turned on or off). In the far jump mode, it is sufficient if the number of tracks jumped by the optical head 4 can be correctly known, and it is not important to check whether the optical head is correctly on a track.

Forward Direction Near Jump

In the forward direction near jump mode, all the switches SW201 to SW203 are open. Therefore, the first feedback element made of the resistor R203 and the second feedback element made of the serially connected resistor R204 and capacitor C202 are inserted between the non-inverting input terminal and output terminal of the comparator CMP200. The non-inverting input terminal is connected to the positive power source +V via the resistors R208 to R210. Accordingly, the potential or slice level at the non-inverting input terminal of the comparator CMP200 is a voltage obtained by dividing the positive voltage +V by the serially connected resistors R202, R208, R209, and R210. This voltage is a positive value Vs1 as indicated at (b) of FIG. 8.

The level of the tracking error signal at the input terminal IN201 is checked by this positive high voltage. Therefore, the output signal of the comparator CMP200 is a correct rectangle as indicated at (e) of FIG. 8.

If the waveforms indicated at (e) and (d) of FIG. 8 are compared with a conventional track traverse detected signal indicated at (c) of FIG. 8, it can be seen that there is a distinct difference therebetween. Specifically, the waveform indicated at (d) of FIG. 8 is a correct rectangle, without having a pulsating signal C at the disturbed area A of the signal near the zero level indicated at (a) of FIG. 8 and a short duration rectangle D at the shoulder B indicated at (a) of FIG. 8.

At the falling edge Po in the negative direction of the rectangular signal indicated at (d) of FIG. 8, information is written. The circuit constants are selected and the slice level is set to detect this falling edge correctly.

Negative Direction Near Jump

In the negative direction near jump mode, the switches SW201 and SW202 are off and the switch SW203 is on. Therefore, a different point from the positive direction near jump is that the negative power source −V is supplied to the non-inverting input terminal of the comparator CMP200 via the switch SW203 and resistors R208 and R209. The slice level of the comparator CMP200 is a negative value Vs2. The level of the tracking error signal is checked using this slice level. A rectangular signal indicated at (e) of FIG. 9 is generated accordingly. As indicate at (d) of FIG. 9, the signal at the output terminal OUT200 is also a rectangular signal.

Similar to the forward direction near jump explained in FIG. 8, the waveform indicated at (d) of FIG. 9 is a correct rectangle, without having a pulsating signal C at the disturbed area A of the signal near the zero level indicated at (a) of FIG. 9 and a short duration rectangle D at the shoulder B indicated at (a) of FIG. 9.

At the rising edge Po in the positive direction of the rectangular signal indicated at (d) of FIG. 9, information is written. The circuit constants are selected and the slice level is set to detect this falling edge correctly.

Far Jump

In the far jump mode, the switches SW201 and SW202 are on. Therefore, the first to third feedback elements are connected between the non-inverting input terminal and output terminal of the comparator CMP200, providing a large feedback amount. Different from the near jump, the comparator CMP200 is not supplied with a voltage via the resistors R208 and R209, and so the potential at the non-inverting input terminal changes with a signal at the output terminal.

Therefore, two positive and negative slice levels Vs1' and Vs2' corresponding to the slice levels Vs1 and Vs2 indicated at (b) of FIGS. 8 and 9 are obtained as indicated at (b) of FIG. 10. The level of the tracking error signal is checked by using these slice levels. A rectangular signal indicated at (e) of FIG. 10 is generated accordingly. A rectangular signal indicated at (d) of FIG. 10 is also obtained at the output terminal OUT.

Similar to the near jump explained in FIGS. 8 and 9, the waveform indicated at (d) of FIG. 10 is a correct rectangle, without having a pulsating signal C at the disturbed area A of the signal near the zero level indicated at (a) of FIG. 10 and a short duration rectangle D at the shoulder B indicated at (a) of FIG. 10.

The rectangular signal indicated at (d) of FIG. 10 is not so precise as the falling edge Po in the negative direction or the rising edge Po in the positive direction of the rectangular signal in the near jump mode. However, the far jump control does not pose any problem even if it is coarse, because the near jump control is executed thereafter.

As described above, in both the near jump mode and far jump mode, the track traverse detecting signal can be obtained from the tracking error signal without being adversely affected by noises contained in the tracking error signal.

What is claimed is:

1. An information recording and reproducing apparatus for an optical information recording medium for recording and reproducing information to and from the optical information recording medium by scanning each track of the medium with a light beam from an optical head, the optical beam being moved from a first position to a second position on the medium through a combination of a far jump driving the optical head and a near jump driving an objective lens assembled with the optical head, comprising:

position reading means for scanning said medium to read present address information;

position storage means for storing said present address information;

traverse signal generating means for generating a track traverse detecting signal by detecting that said optical beam traverses said track on said medium;

motion amount detecting means being reset at the start of the operation of the information recording and reproducing apparatus, for receiving an output of said traverse signal generating means and detecting a motion amount of said optical head over said medium;

switching means for selecting an output of said position storage means when an output of said motion detecting means is zero, and selecting an output of said motion amount detecting means when an output of said motion detecting means is not zero;

target position receiving means responsive to a next information recording and reproducing command for said medium for receiving a target position;

direction designating means for determining a motion direction by comparing said target position received by said target position receiving means with one of said present position stored in said position storage means and said motion amount detected by said motion amount detecting means;

motion distance calculating means for calculating a motion distance by comparing said target position received by said target position receiving means with said present position stored in said position storing means, and calculating said motion distance after the motion start by comparing said target position with said motion amount;

on/off controlling means for a tracking control for performing a near jump scan when said motion distance calculated by said motion distance calculating means is smaller than a predetermined value, and performing a far jump scan when said motion distance is larger than said predetermined value;

motion speed controlling means responsive to a selection of said far jump by said on/off controlling means, for controlling to move said optical had in the motion direction designated by said direction designating means, by half said motion distance calculated by said motion distance calculating means in an acceleration mode, and by the remaining half of said motion distance in a deceleration mode; and driving means for moving said optical head in accordance with outputs form said direction designating means and said motion speed controlling means.

2. An information recording and reproducing apparatus for an optical information recording medium according to claim 1, further comprising:

error detecting means for detecting an error representing a difference between said target position after the completion of said far jump and said present position stored in said position storage means; and error storage means for storing said error detected by said error detecting means, wherein the operation of said motion speed controlling means is controlled in accordance with said error stored in said error storage means.

3. An information recording and reproducing apparatus for an optical information recording medium according to claim 1, wherein said motion speed controlling means includes:

present speed detecting means for detecting a motion speed of said optical head;

optimum speed calculating means for calculating a speed for accelerating and decelerating said optical head in accordance with said speed detected by said present speed detecting means; and driving means for moving said optical head in accordance with an output of said optimum speed calculating means.

4. An information recording and reproducing apparatus according to claim 3, wherein said on/off controlling means turns on a tracking control when an output of said present speed detecting means becomes smaller than a predetermined value.

* * * * *